United States Patent
Wu et al.

(10) Patent No.: US 9,852,222 B2
(45) Date of Patent: Dec. 26, 2017

(54) PERSONALIZING SEARCH RESULTS

(75) Inventors: Xiaoyuan Wu, Shanghai (CN); Sunil Mohan, Los Gatos, CA (US)

(73) Assignee: eBay Inc., San Jose, CA (US)

( * ) Notice: Subject to any disclaimer, the term of this patent is extended or adjusted under 35 U.S.C. 154(b) by 128 days.

(21) Appl. No.: 13/048,498

(22) Filed: Mar. 15, 2011

(65) Prior Publication Data

US 2012/0239519 A1 Sep. 20, 2012

(51) Int. Cl.
*G06Q 30/00* (2012.01)
*G06F 17/30* (2006.01)
*G06Q 30/06* (2012.01)
*G06Q 30/08* (2012.01)

(52) U.S. Cl.
CPC ....... *G06F 17/30867* (2013.01); *G06Q 30/06* (2013.01); *G06Q 30/08* (2013.01)

(58) Field of Classification Search
CPC ... G06F 17/30867; G06Q 30/06; G06Q 30/08
USPC ................................. 705/26.1–27.2
See application file for complete search history.

(56) References Cited

U.S. PATENT DOCUMENTS 6,772,150 B1 *  8/2004  Whitman et al. ............. 707/721
6,963,851 B1 * 11/2005  Szabo et al. ................. 705/26.8
2006/0074883 A1  4/2006  Teevan et al.
2007/0288433 A1* 12/2007  Gupta et al. ...................... 707/3
2008/0077558 A1  3/2008  Lawrence et al.
2008/0215553 A1  9/2008  Badros et al.
2009/0089678 A1*  4/2009  Sacco ................. G06F 17/3089
                                                    715/733
2009/0248682 A1  10/2009  Hueter et al.
2011/0029408 A1  2/2011  Shusterman et al.

FOREIGN PATENT DOCUMENTS

WO   WO-2012125713 A2   9/2012
WO   WO-2012125713 A3   9/2012

OTHER PUBLICATIONS

Gupta, R. (1201). System to generate related search queries Retrieved from https://search.proquest.com/docview/1022875219?accountid=14753.*
"International Application Serial No. PCT/US2012/029060, Search Report dated Jun. 8, 2012", 2 pgs.
"International Application Serial No. PCT/US2012/029060, Written Opinion dated Jun. 8, 2012", 4 pgs.

* cited by examiner

*Primary Examiner* — Kathleen Palavecino
(74) *Attorney, Agent, or Firm* — Shook, Hardy & Bacon L.L.P.

(57) ABSTRACT

Some embodiments provide personalized search services. The personalized search services operate to contextualize what is being searched for and to provide at least some search results in that context that are specific to the user to whom the results are to be provided.

15 Claims, 5 Drawing Sheets

PERSONALIZING SEARCH RESULTS

BACKGROUND INFORMATION

Searching online resources, such as through general internet search engines or search mechanisms provided by online site hosts, has generally become quite good at determining what the public as a whole might be searching for. These mechanisms are generally good at adjusting submitted queries and tailoring query results in accordance with what the general public is searching for.

DETAILED DESCRIPTION

Example methods and systems to personalize search results, such as search results provided within an online marketplace are described. In the following description, for purposes of explanation, numerous specific details are set forth in order to provide a thorough understanding of example embodiments. It will be evident, however, to one skilled in the art that the present subject matter may be practiced without these specific details.

Despite recent advances in searching services available through general internet search engines, site hosts, and within online marketplaces, these searching services often fail to provide search results that are specific to a query of a particular user. Various embodiments illustrated and described herein include at least one of systems, methods, and software that personalize search results based on at least one of user prior action history, user profile information, and other information of a user for which the search results are to be provided. The search results may be provided by one or more search services in response to a specific query submitted by a user or a query generated and submitted to the at least one service by a mechanism to provide content to a particular user for whom a webpage is to be presented. Such a mechanism may be a mechanism that operates to provide product recommendations for a user when visiting an online marketplace or other conduit, such as a device app, that obtains content from an online system and presents the content via the conduit.

Some embodiments provide personalized search services. The personalized search services operate to contextualize what is being searched for and to provide results in that context that are specific to the user to whom the results are to be provided. For example, if a particular user submits a query for "SHORT SLEEVE SHIRT" to an online marketplace and that user has at least one of a prior action history and a profile stored with the online marketplace, or a third-party personalized search service provider, additional information may be obtained to personalize the search query and the search results for that particular user. Upon receipt of the query "SHORT SLEEVE SHIRT" and an identifier of the particular user, the personalized search service may identify in the prior action history or profile of the user that the user is likely "MALE" and likely has an "XXL" shirt size preference. Next, the "SHORT SLEEVE SHIRT" query may be augmented to reflect the men's XXL size preference.

Thus, results obtained in response to the query will be more specific to what the particular user is most likely seeking. In some embodiments, a general search based only on the query submitted by the user may also be performed. In other embodiments, rather than adding additional terms to the query, the query may be submitted as received and the results may be scored based on similarity to item categories and properties that are represented in at least one of the particular user's action history and profile. For example, in some embodiments, upon receipt of a query, one or a few product categories a particular query is most likely relevant to may be identified and utilized to personalize the search to the user, and thereby the search results. For example, for the same query "SHORT SLEEVE SHIRT," the personalized search service may evaluate the prior action history of the user to identify the product category within which the user has performed one or more actions in having the words of the query present in them. Through this evaluation, the personalized search services may identify that the user has performed actions in the product category "T-SHIRTS." Thus, the query "SHORT SLEEVE SHIRT" may be augmented with the term "T-SHIRTS" or be directed specifically at the product category "T-SHIRTS."

The general search results and the personalized search results may then be combined. The combined results may be useful in ensuring the particular user is able to find items when intending to search contrary to the user's prior action history and personal preferences, such as when searching for a gift. These and other embodiments are described in detail below.

In the following detailed description, reference is made to the accompanying drawings that form a part hereof, and in which is shown by way of illustration specific embodiments in which the inventive subject matter may be practiced. These embodiments are described in sufficient detail to enable those skilled in the art to practice them, and it is to be understood that other embodiments may be utilized and that structural, logical, and electrical changes may be made without departing from the scope of the inventive subject matter. Such embodiments of the inventive subject matter may be referred to, individually and/or collectively, herein by the term "invention" merely for convenience and without intending to voluntarily limit the scope of this application to any single invention or inventive concept if more than one is in fact disclosed.

The following description is, therefore, not to be taken in a limited sense, and the scope of the inventive subject matter is defined by the appended claims.

The functions or algorithms described herein are implemented in hardware, software or a combination of software and hardware in one embodiment. The software comprises computer executable instructions stored on computer readable media such as memory or other type of storage devices. Further, described functions may correspond to modules, which may be software, hardware, firmware, or any combination thereof. Multiple functions are performed in one or more modules as desired, and the embodiments described are merely examples. The software is executed on a digital signal processor, ASIC, microprocessor, or other type of processor operating on a system, such as a personal computer, server, a router, or other device capable of processing data including network interconnection devices.

Some embodiments implement the functions in two or more specific interconnected hardware modules or devices with related control and data signals communicated between and through the modules, or as portions of an application-specific integrated circuit. Thus, the exemplary process flow is applicable to software, firmware, and hardware implementations.

Figure 1:
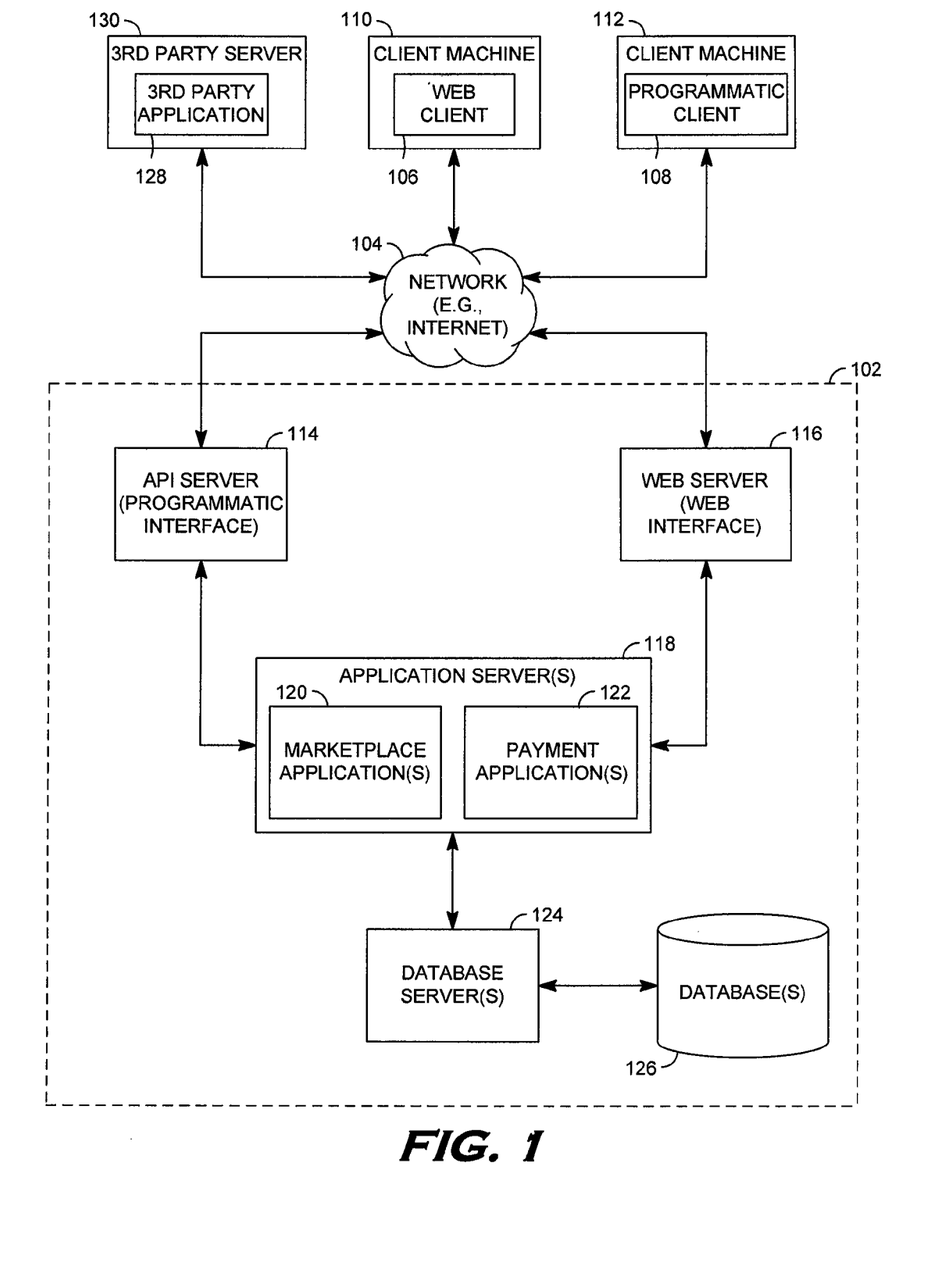
FIG. 1 is a network diagram depicting a client-server system, according to an example embodiment.

FIG. 1 is a network diagram depicting a client-server system 100, according to an example embodiment. A networked system 102, in the example forms of a network-based marketplace or publication system, provides server-side functionality, via a network 104 (e.g., the Internet or Wide Area Network (WAN)) to one or more clients. FIG. 1 illustrates, for example, a web client 106 (e.g., a browser, such as the Internet Explorer® browser developed by Microsoft Corporation of Redmond, Wash. State), and a programmatic client 108 executing on respective client machines 110 and 112. The programmatic client 108 in some embodiments may be an app that executes on one or more particular client machines 112 (i.e., smart phone, television, automobile information center, tablet computing device, optical disk player, gaming console, set top box, and the like) or within a client machine 112 computing environment (i.e., the Android® operating system available from Google, Inc.).

An Application Program Interface (API) server 114 and a web server 116 are coupled to, and provide programmatic and web interfaces respectively to, one or more application servers 118. The application servers 118 host one or more marketplace applications 120 and payment applications 122. The application servers 118 are, in turn, shown to be coupled to one or more database servers 124 that facilitate access to one or more databases 126.

The marketplace applications 120 may provide a number of marketplace functions and services to users that access the networked system 102. The payment applications 122 may likewise provide a number of payment services and functions to users. The payment applications 122 may allow users to accumulate value (e.g., in a commercial currency, such as the U.S. dollar, or a proprietary currency, such as "points") in accounts, and then later to redeem the accumulated value for products (e.g., goods or services) that are made available via the marketplace applications 120. While the marketplace and payment applications 120 and 122 are shown in FIG. 1 to both form part of the networked system 102, it will be appreciated that, in alternative embodiments, the payment applications 122 may form part of a payment service that is separate and distinct from the networked system 102.

In some embodiments, one or both of the marketplace applications 120 and payment applications 122 may be services that operate independently of an online marketplace. In such embodiments, the marketplace applications 120 and payment applications 122 may be provided to online marketplace operators as subscription or contracted services. In other embodiments, the marketplace applications 120 may operate to provide a single portal to products offered for sale by a plurality of online marketplaces. Thus, when a user accesses the networked system 102, the marketplace applications 120 and payment applications 122 may provide one or more of browsing, searching, payment, and other services to the user although the products being viewed is offered by one or more different online marketplaces. Thus, the data of offered products operated upon by the marketplace applications 120 and payment applications 122 may be stored in disparate databases maintained by differing entities.

Further, while the system 100 shown in FIG. 1 employs a client-server architecture, the present subject matter is of course not limited to such an architecture, and could equally well find application in a distributed, or peer-to-peer, architecture system, for example. The various marketplace and payment applications 120 and 122 could also be implemented as standalone software programs, which do not necessarily have networking capabilities.

The web client 106 accesses the various marketplace and payment applications 120 and 122 via the web interface supported by the web server 116. Similarly, the programmatic client 108 accesses the various services and functions provided by the marketplace and payment applications 120 and 122 via the programmatic interface provided by the API server 114. The programmatic client 108 may, for example, be a seller application (e.g., the TurboLister application developed by eBay Inc., of San Jose, Calif.) to enable sellers to author and manage listings on the networked system 102 in an off-line manner, and to perform batch-mode communications between the programmatic client 108 and the networked system 102. Likewise, the programmatic client 108 may also be an app to allow a user to interact with one or both of the API server 114 and web server 116.

FIG. 1 also illustrates a third party application 128, executing on a third party server machine 130, as having programmatic access to the networked system 102 via the programmatic interface provided by the API server 114. For example, the third party application 128 may, utilizing information retrieved or received from the networked system 102, support one or more features or functions on a website hosted by the third party or providing a service to the API server 114. The third party website may provide, for example, one or more promotional, marketplace or payment functions that are supported by the relevant applications of the networked system 102. In additional embodiments, the third party website may provide preference, usage, and other data that may facilitate the making of informed product recommendations and search result personalization for users of the networked system 102.

Figure 2:
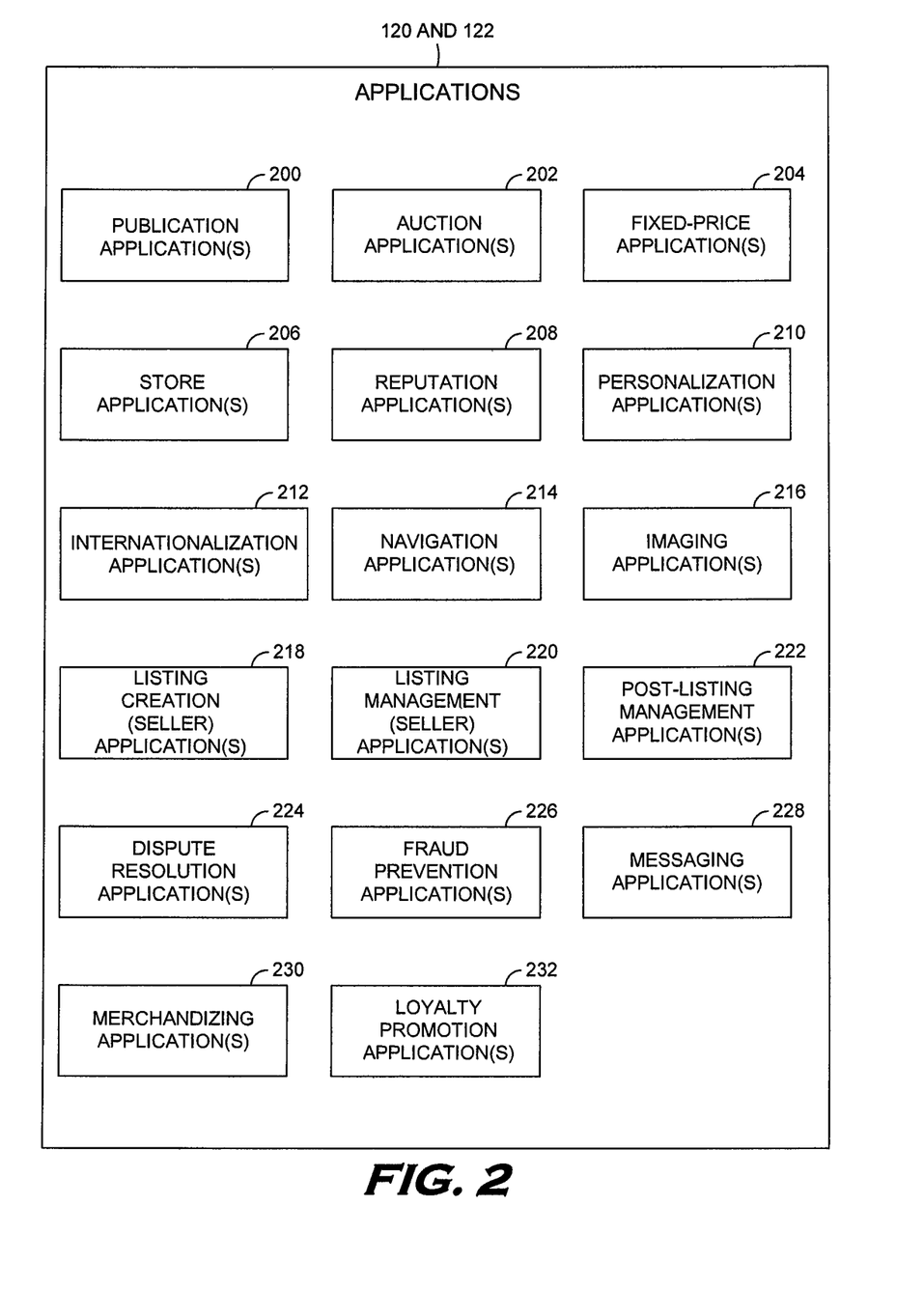
FIG. 2 is a block diagram illustrating multiple applications that, in one example embodiment, are provided as part of a networked system.

FIG. 2 is a block diagram illustrating multiple applications 120 and 122 that, in one example embodiment, are provided as part of the networked system 102. The applications 120 may be hosted on dedicated or shared server machines (not shown) that are communicatively coupled to enable communications between server machines. The applications themselves are communicatively coupled (e.g., via appropriate interfaces) to each other and to various data sources, so as to allow information to be passed between the applications or so as to allow the applications to share and access common data. The applications may furthermore access application servers 118 and one or more databases 126 via database servers 124.

The networked system 102 may provide a number of publishing, listing, and price-setting mechanisms whereby a seller may list (or publish information concerning) goods or services for sale, a buyer can express interest in or indicate a desire to purchase such goods or services, and a price can be set for a transaction pertaining to the goods or services. To this end, the marketplace applications 120 are shown to include at least one publication application 200 and one or more auction applications 202 which support auction-format listing and price setting mechanisms (e.g., English, Dutch, Vickrey, Chinese, Double, Reverse auctions etc.). The various auction applications 202 may also provide a number of features in support of such auction-format listings, such as a reserve price feature whereby a seller may specify a reserve price in connection with a listing and a proxy-bidding feature whereby a bidder may invoke automated proxy bidding.

A number of fixed-price applications 204 support fixed-price listing formats (e.g., the traditional classified advertisement-type listing or a catalogue listing) and buyout-type listings. Specifically, buyout-type listings (e.g., including the Buy-It-Now (BIN) technology developed by eBay Inc., of San Jose, Calif.) may be offered in conjunction with auction-format listings, and allow a buyer to purchase goods or services, which are also being offered for sale via an auction, for a fixed-price that is typically higher than the starting price of the auction.

Store applications 206 allow a seller to group listings within a "virtual" store, which may be branded and otherwise personalized by and for the seller. Such a virtual store may also offer promotions, incentives and features that are specific and personalized to a relevant seller.

Reputation applications 208 allow users that transact, utilizing the networked system 102, to establish, build and maintain reputations, which may be made available and published to potential trading partners. Consider that where, for example, the networked system 102 supports person-to-person trading, users may otherwise have no history or other reference information whereby the trustworthiness and credibility of potential trading partners may be assessed. The reputation applications 208 allow a user, for example through feedback provided by other transaction partners, to establish a reputation within the networked system 102 over time. Other potential trading partners may then reference such a reputation for the purposes of assessing credibility and trustworthiness.

Personalization applications 210 allow users of the networked system 102 to personalize various aspects of their interactions with the networked system 102. For example, a user may, utilizing an appropriate personalization application 210, create a personalized reference page at which information regarding transactions to which the user is (or has been) a party may be viewed. Further, a personalization application 210 may enable a user to personalize listings and other aspects of their interactions with the networked system 102 and other parties. In some embodiments, a user may provide profile information that may be used for various purposes including market, personalization of search results, and providing of product recommendations. The profile information may include demographic information; clothing size, sleeve length, inseam length, waist size, color, cut, style, brand, material preferences, retailer or manufacturer preference, among other properties that certain items of clothing may have; family composition information such as a marital status, a number of children, demographic information about family members, linking to profiles of other family members that are also defined, and other family information; hobby and lifestyle information, interests, and preferences; favorite authors, directors, actors, artists, designers, and other creative person and entity preferences; and other preferences such as flavor that may be useful in different embodiments to personalize the user's experience when visiting an online site, such as an online marketplace. This information may also be gathered and provided as a web service by a personalization application 210 to other websites such as general search engines and other online marketplaces. Similarly, this information may be provided to the personalization application 210 or other portions of the networked system 102, at least in part, by a third party web service accessible via the Internet.

The networked system 102 may support a number of marketplaces that are customized, for example, for specific geographic regions. A version of the networked system 102 may be customized for the United Kingdom, whereas another version of the networked system 102 may be customized for the United States. Each of these versions may operate as an independent marketplace, or may be customized (or internationalized) presentations of a common underlying marketplace. The networked system 102 may accordingly include a number of internationalization applications 212 that customize information (and/or the presentation of information) by the networked system 102 according to predetermined criteria (e.g., geographic, demographic or marketplace criteria). For example, the internationalization applications 212 may be used to support the customization of information for a number of regional websites that are operated by the networked system 102 and that are accessible via respective web servers 116.

Navigation of the networked system 102 may be facilitated by one or more navigation applications 214. For example, a search application (as an example of a navigation application) may enable key word searches of listings published via the networked system 102. A browse application may allow users to browse various category, catalogue, or inventory data structures according to which listings may be classified within the networked system 102. Various other navigation applications may be provided to supplement the search and browsing applications such as a navigation personalization application that operates to personalize search results and browsing based on aspects of a user's interactions with the networked system 102, a user profile, and other information and services gathered and provided by the personalization application 210.

In order to make listings, available via the networked system 102, as visually informing and attractive as possible, the marketplace applications 120 may include one or more imaging applications 216 through which users may upload images for inclusion within listings. An imaging application 216 also operates to incorporate images within viewed listings. The imaging applications 216 may also support one or more promotional features, such as image galleries that are presented to potential buyers. For example, sellers may pay an additional fee to have an image included within a gallery of images for promoted items. Further, in some embodiments, multiple images may be uploaded for a particular listing and properties may be associated with each of the multiple images. These properties may represent colors, jersey numbers, names printed on items, and other properties that may be specific to particular images. Thus, when a user receives an image from a listing, the personalization application 210 may operate in cooperation with the one or more imaging applications 216 to select an image to display with a listing that aligns most closely with the user's preferences.

Listing creation applications 218 allow sellers conveniently to author listings pertaining to goods or services that they wish to transact via the networked system 102, and listing management applications 220 allow sellers to manage such listings. Specifically, where a particular seller has authored and/or published a large number of listings, the management of such listings may present a challenge. The listing management applications 220 provide a number of features (e.g., auto-relisting, inventory level monitors, etc.) to assist the seller in managing such listings. One or more post-listing management applications 222 also assist sellers with a number of activities that typically occur post-listing.

For example, upon completion of an auction facilitated by one or more auction applications 202, a seller may wish to leave feedback regarding a particular buyer. To this end, a post-listing management application 222 may provide an interface to one or more reputation applications 208, to conveniently allow the seller to provide feedback regarding multiple buyers to the reputation applications 208.

Dispute resolution applications 224 provide mechanisms whereby disputes arising between transacting parties may be resolved. For example, the dispute resolution applications 224 may provide guided procedures whereby the parties are guided through a number of steps in an attempt to settle a dispute. In the event that the dispute cannot be settled via the guided procedures, the dispute may be escalated to a third party mediator or arbitrator.

A number of fraud prevention applications 226 implement fraud detection and prevention mechanisms to reduce the occurrence of fraud within the networked system 102.

In some embodiments, the personalization applications 210 may operate in cooperation with the reputation applications 208, the dispute resolution applications 224, and other applications to personalize one or both of a user's search results and browsing experience to provide listings from sellers having certain characteristics with regard to different factors. For example, a user provided or personalization application 210 determined user preference to purchase items from sellers having a certain reputation level or having not been involved in a dispute resolution proceeding maybe applied by a personalization application 210 during a search process or browsing experience by one or more of the navigation applications 214.

Messaging applications 228 are responsible for the generation and delivery of messages to users of the networked system 102, such messages for example advising users regarding the status of listings at the networked system 102 (e.g., providing "outbid" notices to bidders during an auction process or to provide promotional and merchandising information to users). Respective messaging applications 228 may utilize any one of a number of message delivery networks and platforms to deliver messages to users. For example, messaging applications 228 may deliver electronic mail (e-mail), instant message (IM), Short Message Service (SMS), text, facsimile, or voice (e.g., Voice over IP (VoIP)) messages via the wired (e.g., the Internet), Plain Old Telephone Service (POTS), or wireless (e.g., mobile, cellular, Wi-Fi, WiMAX, LTE) networks.

Merchandising applications 230 support various merchandising functions that are made available to sellers to enable sellers to increase sales via the networked system 102. The merchandising applications 80 also operate the various merchandising features that may be invoked by sellers, and may monitor and track the success of merchandising strategies employed by sellers.

The networked system 102 itself, or one or more parties that transact via the networked system 102, may operate loyalty programs that are supported by one or more loyalty/promotions applications 232. For example, a buyer may earn loyalty or promotions points for each transaction established and/or concluded with a particular seller, and be offered a reward for which accumulated loyalty points can be redeemed.

Figure 3:
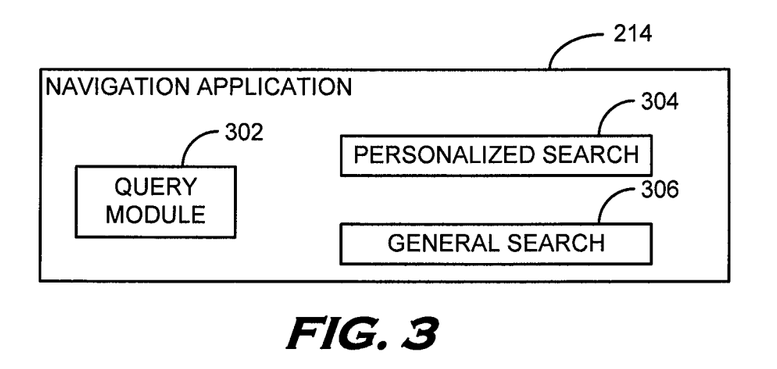
FIG. 3 is a block diagram illustrating modules of one navigation application according to an example embodiment.

FIG. 3 is a block diagram illustrating modules of one navigation application 214 according to an example embodiment. The modules include a query module 302, personalized search module 304, and a general search module 306. The query module 302 is responsive to queries received from users over the network 104. The users may be users of one of the client machines 110, 112, which are generally human users. However, in some embodiments, the users may include logical users such as the third party application 128 that executes on the third party server machine 130.

The query may take the form of a text-based query, such as "SHORT SLEEVE SHIRT," "BLUE JEANS," "GOLF CLUB DRIVER," or "CONVERTIBLE SEDAN." The query may instead include selection-based portions selecting one or more product categories and properties from one or more listings presented to the user. In other embodiments, the query may include text-based input provided by a user into one or more product category or product property fields of a query user interface, such as a date or date range of a product release date or listing posting or ending date, a price range, and a model or brand name. In some embodiments, the query may include two or more of text-based portions, selection-based portions, and product category and property text-based portions. The query may also be provided in other ways depending on the particular embodiment.

In one example embodiment, the query module 302, when receiving a query also receives information identifying the user from which the query is received. The user identifying information may include one or more of a value obtained from a cookie stored on a computing device of the user, a networked system 102 session identifier, a logon ID of the user for accessing the networked system 102, a device ID such as a globally unique identifier (GUID), or other information that may be utilized as an identifier for the user.

The query module 302, in some embodiments, upon receipt of the query may submit the query to one or both of the personalized search module 304 and general search module 306. Both the personalized search module 304 and the general search module 306 receive the query, perform a search to obtain search results, and provide those results back to the query module 302. However, the personalized search module 304 also receives the user identifying data. In some embodiments, a query result set received from both the personalized search module 304 and the general search module 306 includes a score with each search result that is indicative of a likely relevance of the respective result. The score may be indicative of likely relevance with a value between zero (0) and one (1), a ranking of the results provided by each of the modules (a likely relevance relative to other items in the query result set), or other scoring value.

In embodiments where the query is submitted to both the personalized search module 304 and the general search module 306, the query module 302 may then combine the query result sets and return the combined results to the user, such as through the web server 116 or the API server 114. In combining the query result sets, in some embodiments, the query module matches items that are included in both query result sets and adds their relevance scores together, thereby removing a second instance of the same result, but capturing the relevancy scores of both. The query module 302 may then order the combined query results in an order of most to least relevance based on the relevancy scores. In other embodiments, the query module 302 may select a number of most relevant results received from the personalized search module 304 for combining with the query result set from the general search module 306.

In forming the combined query result set, the query module 302 in such embodiments places the number of most relevant results received from the personalized search module 304 at the top of the combined query result set ordered starting with the most relevant. The remainder of the combined query result set in such embodiments is the query result set received from the general search module ordered starting with the most relevant. The number of most relevant results from the personalized search module 304, in some embodiments, is five. However, the number of most relevant results from the personalized search module 304, in other embodiments, may be a configuration setting provided by an administrator of all or a portion of the networked system 102 or by individual users. The combined result set thereby provides a set of search results that are personalized to the user, but are also general in nature in the event the user is searching for items contrary to one or more of the user's profile and action history, such as when searching for a gift or for an item never searched for within the networked system 102.

The personalized search module 304, upon receipt of a query and user identifying data from the query module 302, may first determine if there is user specific data present within the networked system 102, such as may be stored within a database 126. When no user specific data is present, the personalized search module 304 may return a null dataset to the query module 302 or other indication that a personalized query result set may not be obtained. When user specific data is present, the personalized search module 304 will perform a search in view of the user specific data.

The user specific data may be profile information previously provided by the user, which may include information such as demographics (age, address, family composition, etc.), height, weight, clothing size preferences, color preferences, favorite product brands and designers, and product type or category specific preferences. The user specific data may also, or alternatively, include prior action history with regard to items offered within an online marketplace, such as may be provided by the networked system 102. The prior action history may comprise actions such as listed, purchased, viewed, bid, watched, wish listed, saved for later consideration, made an offer, and other actions depending on actions that may be performed within a particular online marketplace. Those actions are generally stored in an action history for at least a brief period and are associated with items offered for sale, including auction, within the online marketplace. The items offered for sale typically have properties, such as size, color, brand, model year or age, designer, type of listing, a user or entity offering the item, and the like. These item properties are stored in a database of items with or in association with the item. Thus, the personalized search module 304 may utilize one or both of user profile information and prior action history data to personalize search results.

In some embodiments, the personalized search module 304 may modify the received query in view of at least one of the user's profile information and prior action history. For example, when the query is a text-based query for "SHORT SLEEVE SHIRT," the personalized search module 304 may query the user's prior action history on the term "SHIRT" to obtain user preferences with regard to shirts. This prior action history query may reveal the user most frequently searches for shirts having a size of "XL" that are made of a fabric that is "100% COTTON." The personalized search module 304 may then modify the received query to include these size and fabric preferences and then submit the query in the modified form of "SHORT SLEEVE SHIRT XL 100% COTTON" to an item database or other searching module, which may be the general search module. The query results, when received by the personalized search module 304, will be ranked or ordered according to conformance with the query terms. If the query result set is not ordered or ranked, the personalized search module 304 will rank the query result set based on conformance with the user preferences.

In other embodiments, the personalized search module 304 may submit the query to the item data as it was received to obtain an initial query result set. Next items included in the query result set may be scored or ranked based on conformance to identified user preferences (i.e., size="XL" and property="100% COTTON").

Next, the personalized search module 304 may provide a query result set back to the query module 302. The query result set provided to the query module 302 may be a subset of the query result set obtained by the personalized search module 304. For example, as discussed above, a number of most relevant search results may be provided, such as five or a number as designated by an administrator or user set configuration setting. In other embodiments, an entire query result set may be provided. The provided query result set, when provided to the query module 302, may be ranked or scored according to relevance to the identified user preferences as also discussed above.

The query module 302 may also submit the received query to the general search module 306. The general search module 306 utilizes the query to obtain a query result set with relevancy to a universe of networked system 102 users. This query result set may take into account user preferences of the universe of network system users or may be based solely on the received query itself. The query result set is then provided by the general search module 306 to the query module 302 for combining with the query result set from the personalized search module 304.

Figure 4:
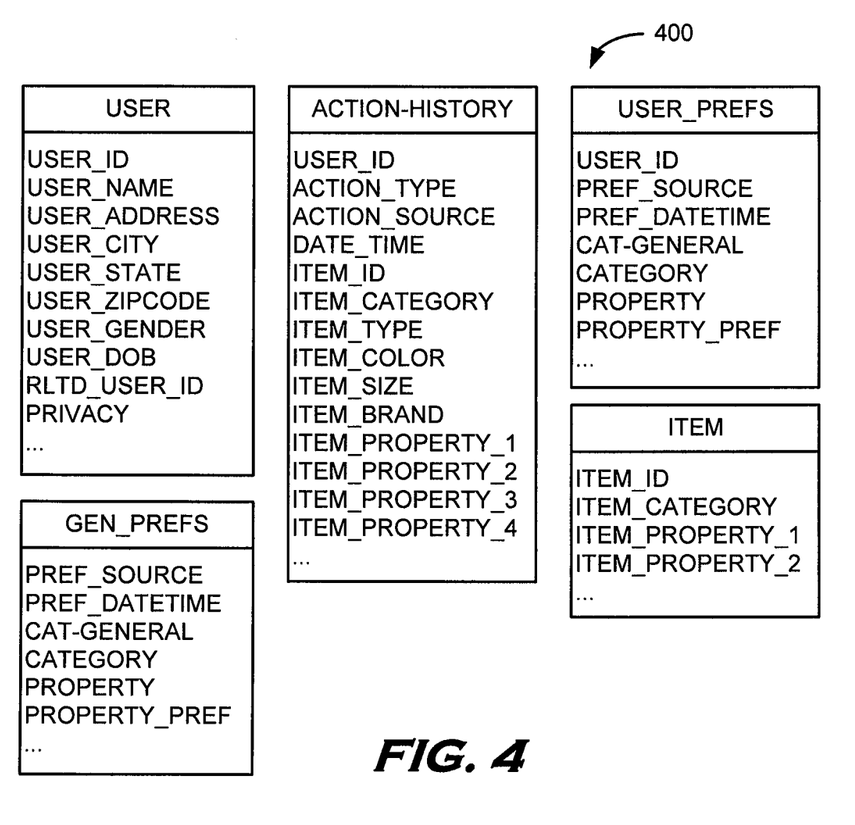
FIG. 4 illustrates example database tables according to an example embodiment.

FIG. 4 illustrates example database tables 400 according to an example embodiment. The database tables 400 include examples of tables of some embodiments within which user data, user prior action data, user preferences, general preferences of all users, and item data are stored. Records within the database tables 400 may be created and populated with data by the one or more marketplace applications 120, such as when a user creates an account, an item is listed, a user performs an action with regard to an item, and the like. Further, general preferences for all user and user specific preferences may be populated into database 400 table records by processes of at least one of the one or more marketplace applications 120 that operate to identify patterns in the prior action history records of all users and specific users. An example of such a process is illustrated and described with regard to FIG. 5.

Figure 5:
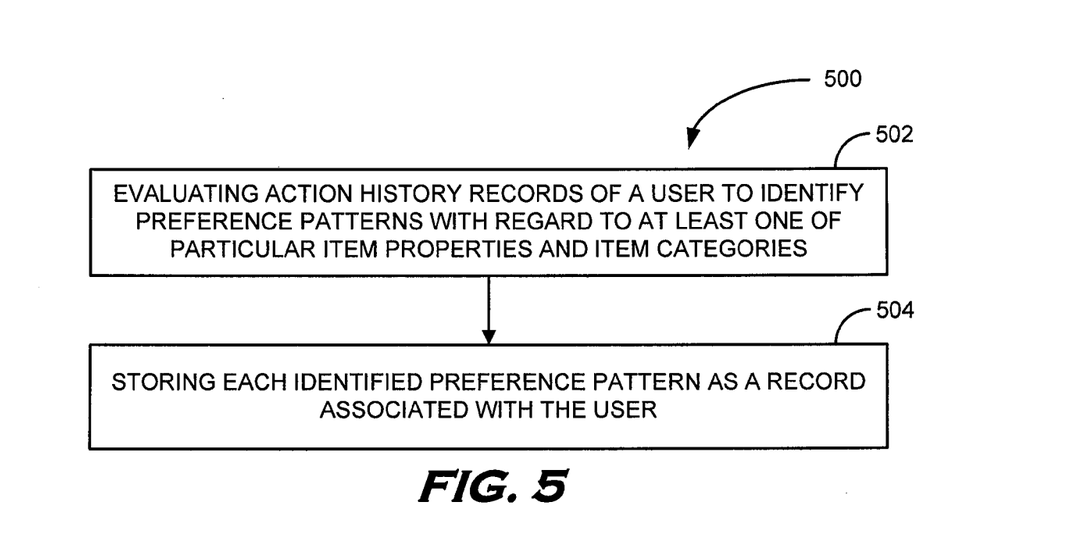
FIG. 5 is a flow diagram of a method according to an example embodiment.

FIG. 5 is a flow diagram of a method 500 according to an example embodiment. The method 500 is an example of a method that may be performed against database records associated with a user to identify preferences of the user. The method 500 is performed in some embodiments with regard to a user upon receipt of a query from that user. In other embodiments, the method 500 may be performed on a periodic basis for all users or a subset of users.

The method 500 includes evaluating 502 action history records of a user to identify preference patterns with regard to at least one of particular item properties and item categories. The evaluating 502 may include counting most commonly occurring properties of items included in the user's prior action history in product categories of items offered for sale within an online marketplace. From the counted occurrences of item properties, the one, two, or another number of most commonly occurring item properties may be deemed an item preference pattern for products of the particular product category. Data representative of each identified preference pattern may then be stored 504 as a record associated with the user in a database table.

In some embodiments, the evaluating 502 may include weighting of prior action history records based on at least one of an age of the prior action record occurred and the type of action represented by the prior action history. For example, more current prior action history records may be given greater weight in identifying patterns by applying a multiplier to records of various ages. The multiplier for most recent records may be a one (1) while older records may have a multiplier applied between 0 and a number less than one (1) (i.e., 0.75, 0.5, 0.25). Similarly, purchase actions may be weighted more heavily than other actions such as view actions. In some embodiments, the weighting of certain actions may be even more involved. For example, in embodiments where the method 500 is implemented within an online marketplace including auctions, the method 500 may include identifying bid actions for a user where the user did not win the auction. These actions may be weighted the heaviest as they are likely indicative of a want or need for an item that has not yet been met. Weighting based on aging may also be applied to such actions as a user's want or need for such items may dissipate over time or be satisfied through a different channel. In any weighting embodiment, the weighting may alternatively be Boolean in nature where prior action history records are identified simply by being within a certain date range, such as within the past week, month, or year. Such prior action history records will be considered while prior action history records outside of the date range will not be considered.

In some embodiments, for an item property to be deemed an item preference, a formula may be applied to determine if the particular item property is statistically significant over other item properties. This may include determining a standard deviation with relation to occurrences of item properties included in a particular category. When the standard deviation is determined to be low (i.e., little to no statistical significance), the method 500 may determine there is not a pattern and continue on to the next product category. When the standard deviation is determined to indicate at least a minimum dispersion, which may be designated by a system administrator, the top standard deviation ranges may be designated as patterns. For example, one or two standard deviations of the most commonly occurring properties may be designated as patterns, and therefore, user preferences. In some embodiments, the method 500 may also take into account combinations of two or more item properties when identifying patterns. Other statistical, mathematical, and behavioral processes may also be utilized depending on the requirements of the particular embodiment.

While the method 500 has been described with regard to identifying patterns within a particular product category, there need not be such a requirement. In some embodiments, the method 500 may be performed without regard to product categories or with regard to multiple product categories that are not necessarily related categories. Identifying such patterns can be useful for many purposes, such as identifying product property preferences of the user that cross product type and category boundaries, such as colors, brands, designers, style characteristics, among others.

The pattern output of the method 500 that is stored 504 as records in a database table, in some embodiments, is available to a personalized search service. The personalized search service, in such embodiments, executes to receive an item category and a user identifier as input from a search process. The personalized search service utilizes the received input to select data from the database table holding the stored 504 pattern output records. The selected data is representative of the identified patterns of item properties of the user with regard to the category identified in the input.

The data representative of the item properties is then returned by the personalized search service to the requesting search process.

Figure 6:
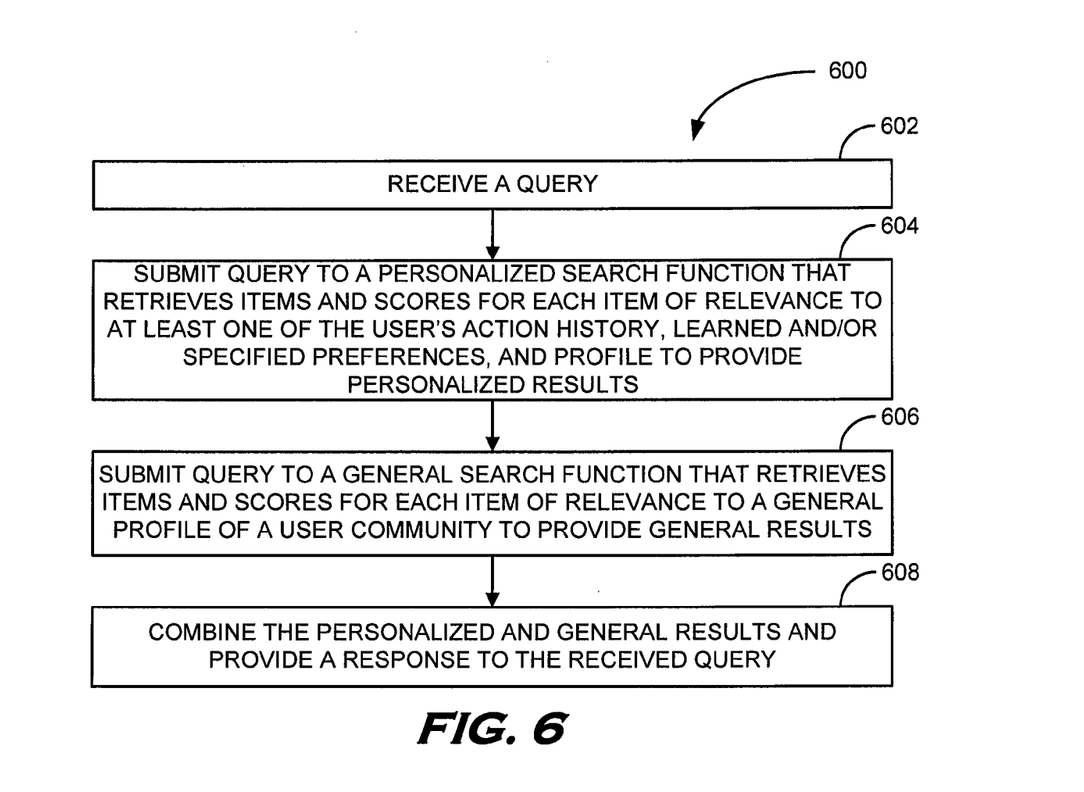
FIG. 6 is a flow diagram of a method according to an example embodiment.

FIG. 6 is a flow diagram of a method 600 according to an example embodiment. The method 600 is an example of a method, according to some embodiments, of personalizing search results in response to queries received over a network. The example method 600 includes receiving 602 a query from a user and submitting 604 the query to a personalized search function. The personalized search function may be a module or other data processing element that retrieves items and scores each item of relevance to at least one of the user's prior action history, user preferences, and profile to obtain and provide personalized search results. The user may have previously provided the user preferences. Alternatively, the user preferences may have been learned by a system, module, or other data processing element within an online marketplace that has evaluated the user's prior action history or other third-party information service provider that has evaluated the user's general web browsing habits.

The method 600 further includes submitting 606 the query to a general search function. The general search function may be a module or other data processing element that retrieves items and scores each item of relevance to a general profile of a user community to provide general results. The profile of the general user community is a profile of all users of a system, such as an online marketplace, within which the method 600 is performed. Thus, results from the general search function are results that other users generally would consider most relevant.

The method 600 continues in some embodiments by combining 608 the personalized results from the personalized search function and the general results from the general search function into a single query result set. The combining 608, in some embodiments, includes matching items present is both the personalized and general results and adding their relevancy scores. This matching may be performed for all or a limited number of personalized search results. The limited number may be five, ten, or some other number depending on the particular embodiment or configuration setting provided by an administrator or a user. The combined 608 query result set may then be ordered from most relevant to least relevant based on the relevancy scoring. The ordering of the query result set may include placing the personalized search results first in the ordered query result set. The ordered query result set may then be provided to the requestor.

Figure 7:
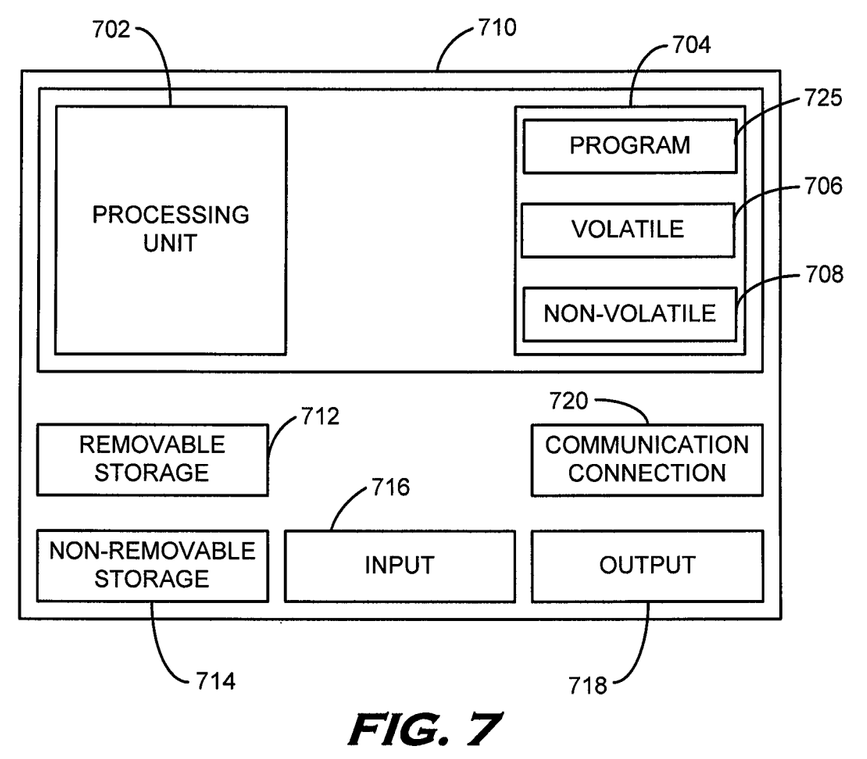
FIG. 7 is a block diagram of a computing device according to an example embodiment.

FIG. 7 is a block diagram of a computing device according to an example embodiment. In one embodiment, multiple such computer systems are utilized in a distributed network to implement multiple components in a transaction-based environment. An object-oriented architecture may be used to implement such functions and communicate between the multiple systems and components. One example computing device in the form of a computer 710, may include a processing unit 702, memory 704, removable storage 712, and non-removable storage 714. Memory 704 may include volatile memory 706 and non-volatile memory 708. Computer 710 may include—or have access to a computing environment that includes—a variety of computer-readable media, such as volatile memory 706 and non-volatile memory 708, removable storage 712 and non-removable storage 714. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions. Computer 710 may include or have access to a computing environment that includes input 716, output 718, and a communication connection 720. The computer may operate in a networked environment using a communication connection to connect to one or more remote computers, such as database servers. The remote computer may include a personal computer (PC), server, router, network PC, a peer device or other common network node, or the like. The communication connection may include a Local Area Network (LAN), a Wide Area Network (WAN) or other networks.

Computer-readable instructions stored on a computer-readable medium are executable by the processing unit 702 of the computer 710. A hard drive, CD-ROM, and RAM are some examples of articles including a computer-readable medium. For example, a computer program 725 capable of performing one or more of the method described herein may be stored on a computer-readable medium.

Another embodiment is in the form of a system that is a component within an online marketplace. The system in this embodiment includes at least one processor, at least one memory device, and a network interface device to facilitate communication of the system on a computer network. The system also includes a query processing module stored in the at least one memory device and executable by the at least one processor to facilitate servicing of queries received via the network interface device. The query processing module, in some embodiments, executes to receive a query from a user and identify at least one item category the query two which the query is relevant. The query processing module, for a category of items in a stored action history of the user accessible via the network interface device, further executes to identify item property patterns. The item property patterns may be identified based on common occurrences of item properties associated with one or more actions, such as a purchase, bid, view, watch, review, comment, and other possible actions performed within the online marketplace.

The query processing module may further execute to submit a received query to a first search process to obtain first search results, each of the first search results including a score indicative of a general relevance of the respective search result. The query processing module in such embodiments also submits the query to a second search process that operates based on the identified patterns to obtain second search results. Each of the second search results will also include a score indicative of a likely relevance of the respective search result to the user. The query processing module will then combine the first and second search results to form combined search results and to return at least a portion in response to the query.

It will be readily understood to those skilled in the art that various other changes in the details, material, and arrangements of the parts and method stages which have been described and illustrated in order to explain the nature of the inventive subject matter may be made without departing from the principles and scope of the inventive subject matter as expressed in the subjoined claims.

What is claimed is:

1. A method comprising:
   determining, based on an analysis of an action history of a user a set of item properties that occur in patterns associated with a search category;
   receiving, from a client device associated with the user, a text-based string representing a first search query;
   determining, based on the text-based string, that the first search query relates to the search category;
   generating, by a personalized search module, a second text-based string that includes at least one item property from the set of item properties that occur in patterns associated with the search category, the second text-based string representing a modified search query;
   processing, through execution of instruction on processor a first search process based on the text-based string representing the first search query, yielding first search results, each of the first search results including a score indicative of a general relevance of the respective search result;
   processing a second search process based on the second text-based string representing the modified search query, yielding second search results, each of the second search results including a score indicative of a likely relevance of the respective search result to the user;
   combining the first and second search results to form combined search results, including identifying first and second search results that match and adding the relevancy scores of matching first and second search results to form a single relevancy score for a single search result in the combined search results; and
   returning, to the client device, at least a portion of the combined search results in response to the search request, wherein the first search process and the second search process are distinct search process that are both performed in response to receiving the text-based string representing the search query.

2. The method of claim 1, wherein determining the set of item properties that occur in patterns associated with the search category comprises identifying patterns of item properties associated with search categories.

3. The method of claim 2, further comprising:
   performing pattern identification for a plurality of item categories on a periodic basis.

4. The method of claim 1, wherein the first search process and the second search process are performed against at least one database of items offered for sale via at least one network-based marketplace system.

5. The method of claim 1, wherein the identifying of patterns of item properties associated with search categories includes identifying a pattern including at least two of a size, a color, a designer, a brand, a flavor, a retailer, and a manufacturer.

6. A system comprising:
   one or more computer processors; and
   one or more computer-readable mediums storing instructions that, when executed by the one or more computer processors, cause the system to perform operations comprising:
   determining, based on an analysis of an action history of a user, a set of item properties that occur in patterns associated with a search category;
   receiving, from a client device associated with the user, a text-based string repressing a first search query;
   determining, based on the text-based string, that the first search query relates to the search category;
   generating second text-based string that includes at least one item property from the set of item properties that occur in patterns associated with the search category, the second text-based string representing a modified search query;

processing, through execution of instruction on processor a first search process based on the text-based string representing the first search query, yielding first search results, each of the first search results including a score indicative of a general relevance of the respective search result;

processing a second search process based on the second text-based string representing the modified search query, yielding second search results, each of the second search results including a score indicative of a likely relevance of the respective search result to the user;

combining the first and second search results to form combined search results, including identifying first and second search results that match and adding the relevancy scores of matching first and second search results to form a single relevancy score for a single search result in the combined search results; and returning, to the client device, at least a portion of the combined search results in response to the search request, wherein the first search process and the second search process are distinct search processes that are both performed in response to receiving the text-based string representing the search query.

7. The system of claim 6, wherein determining the set of item properties that occur in patterns associated with the search category comprises identifying patterns of item properties associated with search categories.

8. The system of claim 7, the operations further comprising:
performing pattern identification for a plurality of item categories on a periodic basis.

9. The system of claim 6, wherein the first search process and the second search process are performed against at least one database of items offered for sale via at least one network-based marketplace system.

10. The system of claim 6, wherein the identifying of patterns of item properties associated with search categories includes identifying a pattern including at least two of a size, a color, a designer, a brand, a flavor, a retailer, and a manufacturer.

11. A non-transitory computer-readable medium storing instructions that, when executed by one or more computer processors of a computing system, cause the computing system to perform operations comprising:
determining, based on an analysis of an action history of a user, a set of item properties that occur in patterns associated with a search category;
receiving, from a client device associated with the user, a text-based string representing a first search query;
determining, based on the text-based string, that the first search query relates to the search category;
generating a second text-based string that includes at least one item property from the set of item properties that occur in patterns associated with the search category, the second text-based string representing a modified search query;
processing, through execution of instructions on a processor, a first search process based on the text-based string representing the first search query, yielding first search results, each of the first search results including a score indicative of a general relevance of the respective search result;
processing a second search process based on the second text-based string representing the modified search query, yielding second search results, each of the second search results including a score indicative of a likely relevance of the respective search result to the user;
combining the first and second search results to form combined search results, including identifying first and second search results that match and adding the relevancy scores of matching first and second search results to form a single relevancy score for a single search result in the combined search results; and
returning, to the client device, at least a portion of the combined search results in response to the search request, wherein the first search process and the second search process are distinct search processes that are both performed in response to receiving the text-based string representing the search query.

12. The non-transitory computer-readable medium of claim 11, wherein determining the set of item properties that occur in patterns associated with the search category comprises identifying patterns of item properties associated with search categories.

13. The non-transitory computer-readable medium of claim 12, the operations further comprising:
performing pattern identification for a plurality of item categories on a periodic basis.

14. The non-transitory computer-readable medium of claim 11, wherein the first search process and the second search process are performed against at least one database of items offered for sale via at least one network-based marketplace system.

15. The non-transitory computer-readable medium of claim 11, wherein the identifying of patterns of item properties associated with search categories includes identifying a pattern including at least two of a size, a color, a designer, a brand, a flavor, a retailer, and a manufacturer.

* * * * *

UNITED STATES PATENT AND TRADEMARK OFFICE
CERTIFICATE OF CORRECTION

PATENT NO. : 9,852,222 B2  
APPLICATION NO. : 13/048498  
DATED : December 26, 2017  
INVENTOR(S) : Xiaoyuan Wu et al.

Page 1 of 1

It is certified that error appears in the above-identified patent and that said Letters Patent is hereby corrected as shown below:

In the Claims

In Column 14, Line 10, in Claim 1, delete "instruction on processor" and insert -- instructions on a processor, --, therefor.

In Column 14, Line 60, in Claim 6, delete "repressing" and insert -- representing --, therefor.

In Column 14, Line 63, in Claim 6, after "generating" insert -- a --.

In Column 15, Line 1, in Claim 6, delete "instruction on processor" and insert -- instructions on a processor, --, therefor.

Signed and Sealed this  
Twenty-third Day of October, 2018

Andrei Iancu  
*Director of the United States Patent and Trademark Office*